Sept. 2, 1924.

W. H. CHASE 1,506,814

BLANK FOR COST ACCOUNTING SYSTEMS

Filed April 5, 1921      7 Sheets-Sheet 1

Fig.1.

Inventor.
William H. Chase
by Heard Smith & Tennant.
Attys.

Sept. 2, 1924.

W. H. CHASE 1,506,814

BLANK FOR COST ACCOUNTING SYSTEMS

Filed April 5, 1921    7 Sheets-Sheet 2

Fig.2.

Inventor
William H. Chase
by Heard Smith & Tennant
Atty's.

Sept. 2, 1924. 1,506,814
W. H. CHASE
BLANK FOR COST ACCOUNTING SYSTEMS
Filed April 5, 1921    7 Sheets-Sheet 3

Fig.3.

Inventor.
William H. Chase
by Heard Smith & Tennant.
Attys.

Sept. 2, 1924.

W. H. CHASE 1,506,814

BLANK FOR COST ACCOUNTING SYSTEMS

Filed April 5, 1921     7 Sheets-Sheet 4

Fig. 4.

Inventor.
William H. Chase
by Heard Smith & Tennant.
Attys.

Sept. 2, 1924.

W. H. CHASE 1,506,814

BLANK FOR COST ACCOUNTING SYSTEMS

Filed April 5, 1921 7 Sheets-Sheet 5

Fig.5.

Inventor.
William H. Chase
by Heard Smith & Tennant
Attys.

Sept. 2, 1924.

W. H. CHASE 1,506,814

BLANK FOR COST ACCOUNTING SYSTEMS

Filed April 5, 1921　　　7 Sheets-Sheet 6

Fig. 6.

Inventor.
William H. Chase
by Heard Smith & Tennant.
Attys.

Sept. 2, 1924.

W. H. CHASE 1,506,814

BLANK FOR COST ACCOUNTING SYSTEMS

Filed April 5, 1921   7 Sheets-Sheet 7

Fig. 7.

| | General | | | | | | | Grand Total |
|---|---|---|---|---|---|---|---|---|
| GENERAL MILL SUPPLIES — Month Ending | | | | | | | | |
| Buildings | 4 50 | | | | | | | |
| Carding Dept. | 2 54 | | | | | | | |
| Dressing Dept. | 2 70 | | | | | | | |
| Finishing Dept. | | | | | | | | |
| Repair Dept. | | | | | | | | |
| Shop | 11 | | | | | | | |
| Boiler House | 6 62 | | | | | | | |
| Engine | | | | | | | | |
| Water Wheels | | | | | | | | |
| Spinning Dept. | 12 67 | | | | | | | |
| Weaving Dept. | | | | | | | | |
| 1 Weave Room | 62 | | | | | | | |
| 2   " | 5 30 | | | | | | | |
| 3   " | 40 | | | | | | | |
| Yard | | | | | | | | |
| GRAND TOTAL | | | | | | | | |

Inventor.
William H. Chase
by Heard Smith & Tennant
Attys.

Patented Sept. 2, 1924.

1,506,814

UNITED STATES PATENT OFFICE.

WILLIAM H. CHASE, OF HOPEDALE, MASSACHUSETTS.

BLANK FOR COST-ACCOUNTING SYSTEMS.

Application filed April 5, 1921. Serial No. 458,681.

*To all whom it may concern:*

Be it known that I, WILLIAM H. CHASE, a citizen of the United States, and resident of Hopedale, county of Worcester, State of Massachusetts, have invented an Improvement in Blanks for Cost-Accounting Systems, of which the following description, in connection with the accompanying drawing, is a specification, like characters on the drawing representing like parts.

This invention relates to a means of effecting a system of cost accounting in textile mills and other manufacturing plants, and more particularly to accounting for distribution of repair parts, supplies and raw material to the various mill departments by supply rooms, mill stores or other distributing agencies in such mills. To demonstrate my invention I will describe its practical application in a textile mill.

It was formerly the general practice in textile plants to distribute supplies in bulk to the several mill departments as soon as received at the mill and charge the same at once to general costs, without regard to the time they might be used in manufacture or to the particular finished goods into the production of which they might go.

It was also the general custom for the mill machine shops to supply repair parts, made and finished by them, to the various producing machines of the mill. In some cases the cost of these repairs was charged to the department receiving them, but for the most part they were accounted for only in the general cost of the machine shop as a repair department.

The distribution of supplies and raw materials in bulk has proved generally wasteful in practice and a handicap to accurate cost accounting, notably in the matter of accounting for the upkeep of machinery as required by Federal tax laws.

The making by the mill's own shop, of repair parts for machinery, especially for modern automatic and other delicate and accurately made machines, is being superseded by the purchase of such parts from the original builders of the machines, requiring the keeping of an emergency stock.

These considerations and general acceptance of the principle of the importance of organization in industry are bringing about the establishment of supply rooms or mill stores, where such emergency stocks of repair parts, whether made in their own plant or purchased outside, of machinery supplies, general mill supplies and various kinds of raw material for manufacture are carried in bulk and distributed as required, with the result of large savings in cost and increased efficiency in the process of production.

Under the older methods of the distribution of materials, the entire accounting for such distribution, so far as there was any, was carried through the regular accounting department of the mill. With the establishment of the mill stores, a secondary accounting system, more or less elaborate, became necessary. Much of the work of this secondary system has necessarily been duplicated in the primary or main office system.

Supplies, repairs or quantities of any other material furnished through the mill stores are obtained on orders or requisitions, and a permanent card inventory of stock on hand is usually maintained. The customary methods of charging up the distribution of materials given out on requisition come under one of the three following plans:—

First. Sending the requisition slips, made out by each applicant for supplies, to the main mill office to have the distribution charged up by the ledger account system to the several departments, or as is necessary in some departments, to the individual mechanic in charge of a group of machines as in the case of a loom fixer.

Second. Making the ledger charges in the same way in the mill stores office.

Third. Making the charges at the time of distribution in books presented by the applicant for supplies, each applicant having two such books which are used on alternate months, one being collected at the end of its month of use for proper ledger charge-offs in the distribution of supplies.

These ledger accounts, whether kept in the supply room or main office, carry the complete account by departments, each department having a separate ledger account where all charges are entered together, but these accounts are not final. It is necessary for the accounting and cost clerks, and very desirable for the manufacturing director, to have periodical reports upon various lines of repair parts, supplies and raw materials. Under the old methods, such monthly, quarterly or semi-annual reports are made only after great labor in searching and comparing ledger accounts and tabulating the figures on the materials on which a report is being made up.

Another undesirable feature of the ledger system as now used in distribution accounting in textile and other mills is the impossibility of making charges against a principal and subsidiary division of the mill and at the same time against a classified material by a single entry of the charge. As an example, in accounting for loom repairs and supplies, the charges should be made by departments, mills, weave rooms or other principal divisions of the mill organization; and also by sections, which are specified groups of looms cared for by a mechanic commonly known as a loomfixer, or fixer. In accounting for repairs on other kinds of machinery, it is necessary to make the charges by departments, such as dressing dept., spinning dept., finishing dept., and also to the particular kind of machine in each department on which repairs are made, such as warpers, cards, slashers, spoolers, etc. In accounting for general supplies and raw materials, the charges must usually be made by principal departments or mills, and also by rooms or other sub-divisions of such departments or mills. At the same time there must be a charge in all these cases against the kind of material distributed.

All of this cannot be done by a single entry under the ledger system; and again reports, based on research and further accounting, are necessary.

Observation of the inadequacy of these methods under modern business and manufacturing conditions, where exact information on the cost of operation and upkeep of machinery is of prime importance, both from the standpoint of the efficiency of the mill and the requirements of Federal accounting, has led to my present invention which comprises the production of a set of classified blanks, designed for use in conjunction with above requisitions and permanent card inventory to make the mill stores accounting system complete in itself, obviating duplication in the primary system and furnishing the latter in the simplest and most usable form such reports and figures as it needs for the final accounting.

This set of classified blanks is so designed that a single entry of a distribution charge will show at one and the same time against both the principal and subsidiary mill division for whom the account must be carried, and also against the classification of the material distributed.

The set of classified blanks is further so designed as to enable storekeepers,—who are generally selected because of their knowledge of the materials handled or of the special requirements of machines or departments and who may not be expert in book-keeping,—to keep accurate accounts of cost of materials and supplies distributed by merely entering the original figures, such as amount and cost, in the proper data columns; to show by these accounts, without additional labor in research, selection and tabulation, the comparative weekly costs of groups of machines and of supplies and raw materials by departments; to provide a series of periodical reports, compiled with comparative ease and with the certainty of accurate figures, which afford easy and immediate comparisons by the executive manager of the plant, and which at the same time furnish in readily usable form the necessary information for the principal accountant of the mill.

The first step in the invention, the foundation of my entire set of blanks and the cause of its greater simplicity and efficiency, was the discarding for distribution charges of the ledger system of accounting, universally used, and the substitution for it of a set of classified blanks designed to make original distribution charges in grouped and sub-divided comparative columns in the course of the daily work of charging. The grouped and sub-divided comparative columns give an opportunity to make a charge against a major and minor division of the mill at one and the same time by a single entry of the charge; and the classification of the sheet carries the same charge against a specified material or class of materials. Together, they automatically provide in each day's work the basis for comparative reports—the real purpose of distribution accounts—without the labor of extensive research, selection and compilation.

The second step was the designing of these comparative column blanks to provide for a week's business, as desired in some departments, or a month's business as called for in others, so that the blanks on which the charges have been made may be turned into weekly or monthly reports, as desired, merely by adding and entering the total for each column. These reports are to be forwarded to the head of the manufacturing department for his information.

The third step was the designing of further blanks for the recording of the distribution totals of the periodical reports so that by the same simple and easy method of merely footing the columns as arranged reports for longer stated periods as required may be furnished to manufacturing executives and chief accountants of the mill, making such reports graphic and informing in the matter of comparative costs—the ease with which such information can be grasped by the executive being of the highest importance; and carrying in such reports to the chief accountant only the figures actually desired by him and putting them in the most readily usable form for the final plant and cost accounting.

Comparative column sheets have been used heretofore in making tabulated reports in connection with the usual methods of accounting; but only for the purpose of comparing figures selected by research from the ordinary ledger accounts. In my invention I have so designed these sheets that they may be used for the daily accounting, and these original sheets become in themselves the report, thus eliminating one set of ledgers and doing away with the work of making special reports by the laborious method of research, selection and tabulation—a real and profitable advance in the art of mill and factory accounting.

One embodiment of my invention is herein illustrated, showing enough sheets such as would be used in a textile mill to make my invention and its new and novel character easily understood. These new and novel features will more fully appear from the following description and the accompanying drawings and will be particularly pointed out in the annexed claims.

Figure 1 shows a classified comparative column sheet such as would be used in a textile mill for the daily accounting and weekly report on distribution of repair parts for looms.

Figure 2 shows a similar sheet for like accounting and report on distribution of parts technically known in a textile mill as loom supplies.

Figure 3 shows a classified comparative column sheet such as would be used in a textile mill in conjunction with Figures 1 and 2 for monthly, semi-annual or other periodical reports on the distribution of both loom repairs and loom supplies.

Figure 4 shows a classified comparative column sheet such as would be used in a textile mill for the daily accounting and weekly report on the distribution of machine repairs (except looms).

Figure 5 shows a classified comparative column sheet such as would be used in a textile mill in conjunction with the sheet as shown in Figure 4 for monthly, semi-annual or other periodical reports on the distribution of machine repairs (except looms).

Figure 6 shows a classified comparative column sheet such as would be used in a textile mill for the daily accounting and weekly report on the distribution of general mill supplies, and, Figure 7 shows a classified comparative column sheet such as would be used in a textile mill in conjunction with the sheet as shown in Figure 6 for monthly, semi-annual or other periodical reports on the distribution of general mill supplies.

The sheets illustrated in the above figures form a complete set of blanks which will enable an accurate, classified, comparative cost accounting to be kept of all repairs and supplies of any character which are distributed through the mill, the entries being made upon the daily and weekly sheets of original entry and the totals of such entries transferred therefrom to the periodical sheets where grand totals may be quickly attained. These sheets present by their comparative columns all the data which is required for the supervision of a mill supplying system and enable the superintendent or other officer of the mill to see at a glance the exact condition of the expenses of each department, section and sub-division, and also present complete data as to the supplies distributed and their costs.

The sheet illustrated in Figure 1 is classified by the printed heading at the top "Loom repairs" with the blank $A^1$ to be filled in by the accounting clerk with the kind of loom on which the repair account is to be kept. $A^2$ is a blank to be filled with the number of looms covered by the report. $A^3$ is a blank space for the date of the end of the week covered by the account.

$B^1$ shows an example of printed directions, which may be changed to meet the needs of any particular mill, for handling the sheet, both while keeping the account and after it has been completed and turned into a weekly report. $B^2$ covers instructions designed to make the sheet easily used by mill superintendent or accountant, as will appear hereafter. $B^3$ shows the meaning of the numbers at the head of the sectional columns, as hereafter explained.

The sheet illustrated in Figure 1 is divided into major, or department, columns with printed heading over each, as $C^1$, $C^2$, and $C^3$, the number of major columns depending upon the number of departments covered by the account.

Each major column is divided by vertical ruling into sectional columns with the number of each fixer at the top, $D^1$, $D^2$, $D^3$, $D^4$, $D^5$, $D^6$, $D^7$, etc. As heretofore explained a fixer is the mechanic who has charge of a specified group of looms known as a section. Every section has a number, and each fixer is known by the number of his section.

As will be readily evident, the width of each major or department column will depend upon the number of fixers in the department, and the width of the sheet upon the combined number of fixers in all departments.

Each sectional column in turn is sub-divided into data columns, one headed "Quantity" for the recording of the number of parts given to a fixer, and the other headed "Cost" for recording the cost of said parts.

At the left of the department columns shown in Figure 1 is a vertical column, E, for the recording of the names or other distinguishing mark of the parts furnished by the mill stores to the fixer, and for the sake of aiding the accountant in making his entries this and the department columns are crossed by parallel horizontal rulings.

As heretofore pointed out, parts or other material distributed by the mill stores to fixers, departments or other applicants for the same are issued on printed requisitions properly filled in with the names and quantities of the material wanted. Under the old method, charges from these requisitions were made in a ledger, all kinds of charges being grouped under the account of the department receiving the material. Under my invention, charges for loom repair parts are made on the sheet shown as Figure 1; and other charges upon the proper classified sheet, as will appear hereafter.

In making entries upon the sheet shown in Figure 1, the mill stores accountant writes upon the horizontal lines of column E the names, or other distinguishing mark, of the repair parts as they appear in turn upon the requisitions from which charges are being made; and upon the same line, in the sectional column headed by the number of the fixer to whom the material was delivered he enters in its proper place the quantity of parts received by him and the cost of the same.

This is repeated until all charges for the week are made, unless he finds a charge for material or parts already given out to some other fixer, in which case he will not make a new entry in column E, but will make a new charge on the line of the previous entry, putting the new quantity and cost in the proper sectional column. The manner in which this appears when completed is shown by the sample entries made on the sheet shown in Figure 1, where the repair part Lm 27406 rocker shaft box is charged to fixer #2, in No. 1 weave room and fixer #24 in No. 3 weave room, the charge being in both cases for one casting at a cost of 50 cents each. The other sample charges show the detail of the accounting as contemplated in my invention.

When all entries for a week have been made—and the size of the sheet used in any mill is planned to be enough for a whole week's entries—the account is completed by adding the cost charges in each sectional column and again in each department column and entering the same on the line for Total by fixers and the line Total by depts. as shown by the sample totals on the sheet shown in Figure 1. In actual practice in the mill these totals are shown in red ink in accordance with the instructions $B^2$.

The sheet shown in Figure 2 is classified by the printed heading "Loom supplies," and there are the same blanks, $A^1$, $A^2$, and $A^3$, to be filled in as in Figure 1. The directions, $B^1$, $B^2$ and $B^3$, the department columns $C^1$, $C^2$ and $C^3$, and the sectional columns, $D^1$, $D^2$, $D^3$, $D^4$, $D^5$, $D^6$, $D^7$, etc., are all the same as in Figure 1. In practice in a particular mill they would be identical, with the same number of department and sectional columns and the same headings.

Column E as illustrated in Figure 2 is also similar except that it is divided by classified headings, $E^2$, $E^3$, $E^4$, $E^5$ and $E^6$, providing for a separate account on the several kinds of supplies, with places for totals on each of these supplies as well as the general totals. These divisions are provided because the textile mill usually wants shuttle cost, picker cost, etc., as well as total cost of supplies.

Charges on this sheet are made in a similar way to those on the sheet shown in Figure 1 except that they are entered in turn under the proper heading instead of in the whole column. Totals by fixers and by departments are made out at the end of the week as for Figure 1 except that there are totals for each sub-division as well as for the sheet.

The sheet shown in Figure 3 shows a classified comparative column sheet such as would be used for reports upon costs covered by the accounts kept on sheets shown in Figure 1 and Figure 2, these reports being for monthly, quarterly, semi-annual or annual periods, as desired by the mill. The more common practice in textile mills is to make these up for the monthly and semi-annual periods, and for the purpose of explaining the use of my invention I have taken such periods for illustration.

This sheet is classified by the printing at the top to cover repairs and supplies on looms of the kind indicated by the description written or printed in the blank $A^1$. Blank $A^2$ would be filled in exactly as the similar blank on Figures 1 and 2. Blank $A^3$ would show the date of the "Month ending —" on a monthly report, or "6 Months ending —" on a semi-annual report, the same being filled in by the clerk making the report.

$B^1$ is an illustration of proper printed instructions for keeping and disposing of the reports. These instructions may be varied to meet the needs of a particular mill.

$B^2$ and $B^3$ are similar to like characters on the sheet illustrated in Figures 1 and 2.

The department columns $C^1$, $C^2$ and $C^3$, and the sectional columns $D^1$, $D^2$, $D^3$, $D^4$, $D^5$, $D^6$, $D^7$, etc., are similar to like columns in Figures 1 and 2, and identical in number in any particular set of accounts, except that the sectional columns are not sub-divided into data columns as in Figures 1 and 2, the reason being that in report sheets "Costs" are the only figures from the account sheets which are used.

Column E is divided by classified subdivisions, $E^2$, $E^3$, $E^4$, $E^5$, and $E^6$, corresponding to those on Figure 2, with the addition of another heading $E^1$, "Loom repairs," to provide for reporting costs shown on Figure 1. Under each of these subdivisions there are six horizontal lines stamped "Week ending" with space for filling in date; and further lines for totals by fixers and totals by depts., both for the several sub-divisions and for the whole account.

Having described Figures 1 and 2 and their use for daily charging of loom repairs and supplies as distributed by requisitions, and having described the report sheet Figure 3, I will now describe how they are used together to make a complete system of accounts on distribution of loom repairs and supplies.

The daily charges from the requisitions are made upon Figures 1 and 2 as already described; and at the end of the week the several sectional columns on costs are footed as already described and the totals are set down in red ink. These sheets are then ready to be forwarded to the superintendent, or other manufacturing executive, but before being so forwarded a record of the totals is made upon the sheet illustrated in Figure 3.

To illustrate how this is done, let us assume that the accounts shown on Figures 1 and 2 as I have filled them in covered the week ending Sept. 4. On Figure 3 the accounting clerk in the mill stores fills in the date, Sept. 4, on the first line stamped "Week ending" under the first sub-division "Loom repairs." He then copies on that line in black ink or pencil the red ink "Totals by fixers" shown on Figure 1, this work being facilitated by the fact that each fixer has the same relative sectional column on both sheets.

Under each of the other sub-divisions, "Shuttles & parts," "Picker sticks," etc., he fills in the date in the same way on the first line and the corresponding totals from Figure 2.

The record thus made on the sheet shown in Figure 3 of the first week of the month, remains in the mill stores office and the sheets illustrated in Figures 1 and 2 go to the superintendent, who finds that the comparative column arrangement and red ink totals enable him almost at a glance to pick out any excessive use of repair parts or supplies. If he cares to go into details they are then before him. From the superintendent these sheets are returned to the mill stores.

Meanwhile the mill stores clerk has been using another pair of sheets like Figures 1 and 2 for the week ending Sept. 11. In turn these sheets are totaled and the totals copied on the sheet shown in Figure 3 in the second line under each sub-division, as illustrated. This continues until the account for the week ending with the last Saturday in the month is completed and copied, when the sheet illustrated in Figure 3 is added up as the other sheets have been and the totals by fixers and by depts. are recorded under each sub-division and for the sheet—in red ink in actual practice.

This summary sheet is now ready to be forwarded, but in turn a semi-annual report is started from this, in which another sheet like that of Figure 3 is used, but with date blank at top filled in to read " 6 Months ending —" and under each sub-division, " 4 Weeks ending Sept. 25," " 5 Weeks ending Oct. 30," " 4 Weeks ending Nov. 27," etc., the dates in these cases corresponding with the dates of the several monthly reports. The totals from the monthly reports are copied upon the semi-annual report in exactly the same way the weekly totals were entered on the monthly reports.

The completed monthly and semi-annual reports are forwarded as made out to the mill superintendent, and by him in turn to the chief accountant. If desired, the semi-annual report may be made in duplicate, one copy being retained in the mill stores office.

I have here described one unit, or one set of classified sheets, of my system. Other units are similar in nature, design and use, except for minor details, which will be described later. Meanwhile I would point out some of the new and novel features of my invention that have already been shown.

By a single bookkeeping entry on the sheets illustrated in Figures 1 or 2, I have made a charge under a classified material, in some cases doubly classified, against a department, or weave room, and against a workman, known as a loomfixer, in that department.

The same classification and double charging appear in the reports, greatly reducing the work of making reports and increasing their value and use to the mill.

These advantages are made possible by the adaptation of the comparative column principle to ordinary stock distribution accounting, original with my inventon, and the simple and ingenious classified blanks I have designed for practical application of the principle.

These blanks further provide that daily accounting sheets may be turned into periodical reports by merely footing the columns and recording the totals; and further blanks make reports for longer periods equally simple and easy to make out, eliminating entirely the laborious methods, common under the ledger charging system heretofore used, of making reports by searching, selecting and tabulating the charges for any desired classification.

These periodical reports carry to the superintendent complete information on the cost of repairs, shuttles, picker sticks, pickers, lug straps, and other leather parts, all of which enter into the cost of the upkeep of the looms. This cost is shown as distributed by fixers, thereby giving him a means of checking up their efficiency. The superintendent gets these figures weekly, monthly and semi-annually.

The monthly and semi-annual reports go to the mill's chief accountant, furnishing him the figures in the exact form he needs for final accounting, eliminating in his department any need of duplicating the mill stores accounting, a very great saving over present methods.

An example of the great saving by these reports is found in the matter of making up Federal accounts. One of the necessary requirements of such accounts is the cost of the upkeep of machinery. The combined totals of the two semi-annual reports, divided by the number of looms, shown at $A^2$, gives the cost per loom per year. Under any system heretofore used this result has been attained only after laborious search and compilation, and many mills have only been able to estimate or approximate the figures.

The elimination of double accounting, reduction in the amount of labor even where only a single set of accounts is kept, more intelligible and comprehensive reports, more easily made, a constant knowledge of costs, all presented in the most usable and accessible form are the advantages of my system of classified comparative column sheets.

In the sample sheets of my system so far described I have indicated how they would be used in accounting for distribution accounts where weekly reports are desirable, but there are materials upon which such frequent reports are not necessary.

Figure 4 shows a sheet such as would be used for accounting for repairs on machines other than looms. The sheet is classified, as in all cases, by the descriptive printing at the top. In this sheet the department columns are divided into sectional columns, the latter in this case accounting for the different kinds of machines in the department, there being one sectional column in each department column for each kind of machines in that department; and again the sectional columns are divided into data columns to cover "quantity" of parts distributed and "cost" of the same.

The method of charging is exactly the same as that above described with reference to the sheet shown in Figure 1.

Monthly reports are commonly desired on these repairs, not weekly as in the case of loom repairs. The sheet may be turned into a monthly report by footing the columns in exactly the same way as those of Figure 1, but the amount of monthly business being of a more unequal nature and details being of less importance to the manufacturing executive, I have planned for using this sheet continuously for the charging account and to have a separate set of report sheets for monthly and semi-annual reports. The figures for these reports, however, are obtained by the same simple method of footing the sectional columns on the account sheets, entering these figures in red ink, not at the bottom of the sheets as on the sheet shown in Figure 1, but on the horizontal line next following the last charge made. The next month's business then follows on the same sheet, with the total recorded in the same way. At the end of six months, marking the semi-annual term, there would also be a second set of red ink totals across the sheet, this second set being the semi-annual totals. Sheets are used consecutively, the account being carried from one to the next, and may be appropriately numbered, and dated if desired in the blank at the upper right hand corner.

Figure 5 shows a classified blank such as would be used for graphic monthly and semi-annual reports in connection with the sheet shown in Figure 4. It would be dated in the upper right hand corner as "Month ending —", as the case required. Appropriate department headings are printed over the columns and the names of the different kinds of machines are printed on successive horizontal lines in the wide column at the left, preferably in alphabetical order.

In recording the monthly totals from the sheet of Figure 4 upon that shown in Figure 5, the totals in the several sectional columns of a department column on Figure 4 would be entered in the corresponding department column on Figure 5, those for each machine on the appropriate horizontal line, as indicated by the examples shown. When all charges have been made, the sheet is totaled in two ways, by machines in the column so marked at the right, and by departments as indicated at the bottom, making the sheet of greatest possible use to both manufacturing executive and mill accountant.

Semi-annual reports are made in the same way, copying the semi-annual figures from Figure 4 and totaling the same way by both machines and departments.

Figure 6 shows a sheet such as would be used in charging general mill supplies. It is used exactly like the sheet shown in Figure 4 except that instead of having department columns divided into sectional columns for machines, some departments have a single sectional column and others a department column with sectional columns for sub-divisions. The charges and monthly and semi-annual totals are made out in exactly the same way.

Figure 7 shows the report sheet to be used in connection with the sheet shown in Figure 6. It is dated in the manner already described for other report sheets. The department names are printed on the horizontal lines in the wide column at the left, preferably in alphabetical order as in the case of machines on the sheet shown in Figure 5.

If the mill desires a single classification for all general mill supplies a single data column is all that is required to carry the monthly report; and the six columns shown may be used for succeeding months to complete the semi-annual report, with totals by departments in the column set off at the right and totals by months at the bottom.

Frequently, however, the mill wants a partial classification of general mill supplies. A separate account may be desired of oils and greases, of starch, or some other material. This would be provided for by using special classified sheets, similar to those of Figure 6, and Figure 7 and would be made up with the several classifications over the several data columns, as General mill supplies, Oil and greases, Starch, etc., and this would call for department totals at the left and classified totals at the bottom on both the monthly and semi-annual reports.

For other distribution accounts some one of the sets of sheets so far described, but with headings printed to fit the case, would be used.

It will be understood that, whereas the present invention has been described with particular reference to an accounting system for textile mills, such application of the invention is merely illustrative and that the same may be adapted to the conditions and circumstances of other industries by obvious modifications. The following claims are, therefore, intended to cover broadly any devices for effecting the system of accounting embodying the principles above stated.

Having thus described my invention, what I claim as new, and desire to secure by Letters Patent, is:

1. A classified blank of original entry for an accounting system showing comparative distributions and costs charged against the respective sections and the respective divisions of a department of an industry, comprising a ruled sheet having a series of parallel lines to receive the designation of entries of various materials, traversed by vertical lines dividing the same into a column for the designation of the materials, followed by a series of comparative data columns which are sub-divided to receive original entries and grouped within minor columns having sectional headings which in turn are grouped within major columns having divisional headings whereby comparative original entries of distribution and data charges will show against the classification of the material distributed and also against the sections and divisions for which the account is carried.

2. A classified blank of original entry for an accounting system showing comparative distribution and costs charged against the divisions and sections of an industry, comprising a ruled sheet having a series of horizontal parallel lines to receive the designation entries of the distributed materials, traversed by vertical lines dividing the sheet into a column to receive the designations of the various kinds of materials, followed by a series of columns which are sub-divided into data columns to contain entries relating to said materials, said data columns being grouped progressively in sectional columns which are in turn grouped in divisional columns for a department, whereby original entries in the data columns are automatically charged against the kind of material and simultaneously comparatively classified within the sections and the sections comparatively classified within the divisions forming the department, whereby a total may be obtained without transcription of all articles of a designation of entries in a section and all entries in a division and the sum total of all divisions of a department.

3. A classified blank for an accounting system showing comparative distribution and costs charged against the divisions and sections of an industry, comprising a ruled sheet having a series of parallel horizontal lines divided into classified groups, each having an appropriate heading to cover designations of the specific materials under said headings, traversed by vertical lines dividing the sheet into a column to receive said designations, followed by a series of columns which are sub-divided into data columns to receive original quantity and cost entries of the distributed material, said columns being progressively grouped into minor and major columns having appropriate sectional and divisional headings whereby original entries of distribution charges will show against the particular classification of the material and group and also against the section and division of the department for which the account is carried.

4. A set of classified blanks for an accounting system showing comparative distribution and costs charged against the divisions and sections of an industry, comprising ruled sheets for original entries having a series of horizontal parallel lines to receive designations of the materials and distribution entries, traversed by vertical lines dividing the same into comparative data columns grouped in minor columns having sectional headings which in turn are grouped into major columns having divisional headings in combination with a ruled sheet for periodical reports comprising a series of parallel horizontal lines traversed by vertical lines dividing the same into comparative data columns to receive the totals of the data columns of original entry, said columns being progressively grouped into minor and major columns which are similar to and bear the same headings as those of the sheets of original entry and adapted to present the totals of the sheets of original entry for a stated period as charged against the kinds of material and the sections and divisions of the department for which the account is carried.

5. A classified blank for a system of cost accounting for textile mills showing comparative distribution and cost charged against the respective sections and respective divisions of a department of the mill, comprising a weekly sheet bearing a heading "Loom repairs" for original entries of loom repairs having a series of parallel horizontal lines traversed by vertical lines dividing the sheet into a column to receive designations of the various kinds of materials, followed by a series of columns each having a heading to indicate the section of the mill controlled by a single head or fixer, said columns being sub-divided into quantity and cost columns, said columns being classified in inclusive columns designating the weave rooms to which the loom repairs were furnished.

6. A classified blank for a system of cost accounting for textile mills showing comparative distribution and cost charged against the respective sections and respective divisions of a department of the mill, comprising a weekly sheet bearing a heading "Loom supplies" for original entries of loom supplies, having a series of parallel horizontal lines traversed by vertical lines dividing the sheet into a column to receive designations of the various kinds of materials in classified groups having appropriate headings, followed by a series of columns having headings to indicate the section of the mill controlled by a single head or fixer, said columns being sub-divided into quantity and cost columns, said columns being classified in inclusive columns designating the weave rooms to which the loom supplies were furnished.

7. A classified periodical blank for a system of cost accounting for textile mills showing comparative distribution and cost charged against the respective sections and respective divisions of a department of the mill, comprising a sheet bearing the heading "Loom repairs and supplies" having a vertical column divided horizontally into sections provided with printed headings corresponding to those of the loom repair and supply sheets of the original entry, said column being followed by a series of data columns to receive entries of the totals of the period appearing upon the sheets of original entry, said data columns being grouped into progressively inclusive sectional and divisional columns having headings corresponding to those of the loom repair and loom supply sheets of original entry.

8. A set of classified blanks for an accounting system for textile mills showing comparative distribution and cost charged against the respective sections and respective divisions of a department of the mill, comprising:—(1) a weekly sheet of original entries bearing a heading "Loom repairs" having a series of parallel horizontal lines traversed by lines dividing the same into a column for the designation of the distributed materials, followed by a series of data columns which are sub-divided for the entries of quantity and cost and provided with headings indicating the sections controlled by single heads or loom fixers, the sectional columns being grouped into inclusive columns having headings identifying the weave rooms of a department: (2) a weekly sheet of original entires bearing a heading "Loom supplies" having a vertical column for the designation of materials, divided horizontally into classified groups having appropriate headings to include the articles belonging to said groups, said column being followed by data columns sub-divided and grouped to correspond to those of the "Loom repair" sheet, and, (3) a periodical summary sheet bearing a heading "Loom repairs and supplies", having a vertical column divided horizontally into sections provided with appropriate headings corresponding to those of the "Loom repair" and "Loom supply" sheets, each of said groups having printed designations for the period covered by the sheets of original entry, said column being followed by a series of sectional columns divided into data columns to receive the totals of the entries of quantity and costs from the sheets of original entry, said sectional columns being grouped into columns having a heading "Weave room" corresponding to those of the sheets of original entry.

9. A classified blank for a system of cost accounting for textile mills showing the comparative cost of supplies for the various departments of the mill comprising a weekly sheet, bearing the heading "Machine repairs (except looms)", for original entries having a series of parallel horizontal lines traversed by vertical lines dividing the sheet into a column to receive designations of the various kinds of materials, followed by a series of columns having headings to indicate the machines for which the repairs were supplied, said columns being subdivided into quantity and cost columns, the columns also being classified into inclusive columns designating the departments to which said repairs were furnished.

10. A classified periodical summary blank for a system of cost accounting for textile mills, showing the comparative quantity and cost charged against the various departments of the mill comprising a sheet bearing the heading "Machine repairs (except looms)," together with a statement of the period covered, having a vertical column containing the names of the machines for which the repairs were supplied, followed by a series of columns having appropriate headings to designate the departments to which the repairs were supplied, said columns being adapted to receive totals from sheets of original entry and a marginal column having a heading "Total by machines" the base of said sheet being provided with a space for "Totals by departments."

11. A classified blank for a system of cost accounting for textile mills, showing the comparative quantity and cost charged against various buildings or sections of buildings of the mill comprising a weekly sheet bearing the heading "General mill supplies," having a series of parallel horizontal lines traversed by vertical lines dividing the sheet into a column to receive designations of the various kinds of materials distributed, followed by a series of columns having headings to indicate the buildings or sections of the mill to which the supplies were furnished, said columns being subdivided into quantity and cost columns, said columns being classified in inclusive columns designating the departments to which said supplies were furnished.

12. A classified periodical summary blank for a system of cost accounting for textile mills, comprising a sheet bearing the heading "General mill supplies," together with a statement of the period covered, having a vertical column to receive designations of the various departments of the mill to which the supplies were furnished, followed by a series of columns to receive entries of total costs appearing on the sheets of original entry charged against said department, said columns having headings corresponding to the departments to which the supplies were furnished, and a marginal column to receive grand totals of the various departments with a space at the base of the sheet to receive grand totals for the various departments.

13. A series of blanks for an accounting system showing comparative distribution and cost charged against the various departments, divisions and sections of an industry, comprising a blank of original entry having a series of lines to receive designations of the various materials furnished, traversed by vertical lines dividing the same into sets of comparative columns to receive original entries of data including the quantity and cost of the articles supplied, comparative minor columns bearing sectional headings which include a plurality of said data columns and comparative major columns bearing divisional headings which include a plurality of sectional columns in combination with, a periodical blank having parallel lines to receive the designation of the articles furnished during the period and having vertical columns bearing headings similar to the columns of the blanks of original entry to receive totals of like columns from the blanks of original entry and also in combination with a summary blanks having a series of lines to receive designations of the various materials furnished and vertical columns to receive the totals from the periodical sheet, said columns comprising data columns which are included in comparative minor columns having sectional headings which are in turn grouped in major columns having department headings, whereby the series of sheets when filled out present a comparative table showing the total and the relative amount of cost of materials supplied to the various departments, the divisions of said departments, the sections of said divisions, and also the quantity and cost of each article supplied.

In testimony whereof, I have signed my name to this specification.

WILLIAM H. CHASE.